US010338564B2

(12) United States Patent
Gordon et al.

(10) Patent No.: US 10,338,564 B2
(45) Date of Patent: Jul. 2, 2019

(54) REMOTE MATERIAL YIELD OPTIMIZATION FOR LEATHER AND OTHER HETEROGENEOUS MATERIAL

(71) Applicant: GERBER TECHNOLOGY LLC, Tolland, CT (US)

(72) Inventors: Thomas A. Gordon, Glastonbury, CT (US); William T. Lord, Pelham, NH (US); Todd Alan Rhodes, Tolland, CT (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 340 days.

(21) Appl. No.: 14/937,487

(22) Filed: Nov. 10, 2015

(65) Prior Publication Data

US 2017/0131703 A1     May 11, 2017

(51) Int. Cl.
| | |
|---|---|
| *C14B 5/00* | (2006.01) |
| *G05B 19/4097* | (2006.01) |
| *G06Q 10/04* | (2012.01) |
| *C14B 17/00* | (2006.01) |

(52) U.S. Cl.
CPC ............ *G05B 19/4097* (2013.01); *C14B 5/00* (2013.01); *C14B 17/005* (2013.01); *G06Q 10/043* (2013.01); *G05B 2219/35162* (2013.01); *G05B 2219/45044* (2013.01)

(58) Field of Classification Search
None
See application file for complete search history.

(56) References Cited

U.S. PATENT DOCUMENTS

| | | | | |
|---|---|---|---|---|
| 5,258,917 | A | * 11/1993 | Bruder | .................. B23K 26/032 |
| | | | | 348/125 |
| 5,748,762 | A | 5/1998 | Guez | |
| 5,757,950 | A | * 5/1998 | Bruder | ..................... B26D 5/00 |
| | | | | 382/111 |
| 2007/0034297 | A1 | 2/2007 | Zielke et al. | |
| 2007/0150087 | A1 | 6/2007 | Tang et al. | |
| 2007/0203858 | A1* | 8/2007 | Olsen | ..................... G06Q 20/02 |
| | | | | 705/400 |
| 2007/0293975 | A1* | 12/2007 | Hama | ...................... B26D 5/00 |
| | | | | 700/134 |

(Continued)

FOREIGN PATENT DOCUMENTS

| | | |
|---|---|---|
| CN | 1986835 A | 6/2007 |
| EP | 0883074 A2 | 12/1998 |

OTHER PUBLICATIONS

International Search Report issued in corresponding international application No. PCT/US16/61071, datd Feb. 7, 2017.

(Continued)

*Primary Examiner* — Paul B Yanchus, III
(74) *Attorney, Agent, or Firm* — Day Pitney LLP (57) ABSTRACT

A system for processing a work-piece including a sheet of material into pieces includes a production environment configured for collecting data characterizing the work-piece and for subsequently cutting the work-piece into a plurality of products; and a development environment separate from the production environment, the development environment configured for receiving characterization data from the production environment, developing a nesting strategy for cutting the work-piece and providing the nesting strategy.

31 Claims, 4 Drawing Sheets

(56) References Cited

U.S. PATENT DOCUMENTS

2014/0371905 A1* 12/2014 Eberst .................... B25J 9/1664
700/253
2016/0052214 A1* 2/2016 Gilbert .................... B29C 70/38
700/33

OTHER PUBLICATIONS

International Report on Patentability and Written Opinion issued in corresponding international application No. PCT/US16/61071, dated Feb. 7, 2017.

* cited by examiner

REMOTE MATERIAL YIELD OPTIMIZATION FOR LEATHER AND OTHER HETEROGENEOUS MATERIAL

BACKGROUND OF THE INVENTION

1. Field of the Invention

This disclosure relates to the remote management of nesting strategies and nesting operations for cutting of leather and other irregular materials.

2. Description of Related Art

Cutting of irregularly shaped parts whether for apparel, industrial fabrics, leather, or the like from within a web of material requires arranging individual parts strategically. Parts can be placed or packed in relationship with one another in such a fashion as to optimize the use of the material. This packing operation, commonly known as nesting, is required for cutting of materials regardless of cutting means such as; computer numerically controlled (CNC) machine, die cutting press, or manual (hand) cutting. Nesting gains another level of complexity for materials that are irregular in shape or those that have defects that render certain areas unusable.

During set-up of a CNC machine, a technician will experiment with strategy selection testing multiple strategies over a range of job types in order to converge on a strategy which produces the optimal yield/time balance. This is a time consuming process and only a fraction of the available nesting strategies are evaluated prior to putting a new cutter into production. Once the technician leaves, it is rare that machine operators will take the time to search for better strategies. More often than not, an operator will not deviate from the initial strategy selection. Since it can take several minutes to develop a single nesting strategy, it is not feasible to run multiple serial nesting trials in production to determine if an optimal yield solution was achieved. As a result, operators typically forego development of multiple nesting strategies for comparison and efficient use of material. Therefore, CNC leather processors are wasting material at considerable expense.

What are needed are techniques for improving yield in material cutting operations. The techniques should provide for enhancements for any specific production work order with minimal or no negative impact on material workflow throughput.

SUMMARY OF THE INVENTION

In one embodiment, a system for processing a work-piece including a sheet of material into pieces is disclosed. The system includes a production environment configured for collecting data characterizing the work-piece and for subsequently cutting the work-piece into a plurality of products; and a development environment separate from the production environment, the development environment configured for receiving characterization data from the production environment, developing at least one nesting strategy for cutting the work-piece and providing the at least one nesting strategy.

The development environment may include a remote system for providing the at least one nesting strategy. The system may include a computer program product including machine executable instructions stored on machine readable media, the computer program product including instructions for computing the at least one nesting strategy. The at least one nesting strategy may associate placement the plurality of shapes according to at least one of a shape of the work-piece, a seed-point associated with the work-piece, defects identified in the work-piece and grading of the material of the work-piece. The development environment may be configured to develop the at least one nesting strategy according to at least one of a requirement for yield and a limitation on computing time. The system may further include an imaging system configured for at least one of collecting an image of the work-piece, identifying a defect within the work-piece, and grading the quality of an area of the work-piece. The system may further include an imaging system configured for providing an outline of the work-piece, a defect map of the work-piece and a grade map of the work-piece. The system may further include a cutting system configured for at least one of: controlling a cutting system; projecting the at least one nesting strategy onto the work-piece; facilitating manual placement of cutting dies onto the work-piece; and, placing cutting dies onto the work-piece.

The at least one nesting strategy may be configured for use by a computer numerically-controlled (CNC) machine configured for cutting the work-piece. The development environment a may include library module configured for at least one of storing information regarding the at least one nesting strategy in a library, and retrieving information from the library for development of the at least one nesting strategy. The library module may be configured to provide a seed-strategy to the development environment. The library module may be configured to store at least one of: layout information, hide geometry, a defect map, a job requirement, yield, computation time and processing time in the library. The development environment may further include an input for receiving a seed-strategy for starting computation of the at least one nesting strategy.

In another embodiment, a method for processing a work-piece that includes a sheet of material into a plurality of pieces of product is provided. The method includes: receiving criteria for a nesting strategy from a production environment; and, iteratively determining the nesting strategy according to the criteria.

The nesting strategy may include a layout of the pieces of product to be cut from the work-piece. In some embodiments, iteratively determining may include changing a layout of the product to provide for increased product yield. A plurality of nesting strategies for a single work-piece may be provided. A preferred nesting strategy from a plurality of nesting strategies may be selected. The work-piece may be cut into the product according to the preferred nesting strategy. Selecting the preferred nesting strategy may include at least one of comparing one nesting strategy to another nesting strategy and performing a statistical analysis.

In another embodiment, a computer program product including machine executable instructions stored on machine readable media, the computer program product including instructions for processing a work-piece including a sheet of material into pieces of product by implementing a method, the method including: receiving an image of the work-piece and an associated job description, the job description including a plurality of shapes to be cut from the work-piece; retrieving from a library an initial nesting strategy that includes a layout of the shapes to be cut from the work-piece; and, rearranging the layout of shapes in the initial nesting strategy according to user criteria to provide a nesting strategy.

The user criteria may include at least one of yield, computing time, production time, and grade of material for each of the pieces of product. Instructions for storing information regarding the nesting strategy in the library may be included. Instructions for manually placing or for controlling a robotic system for placing at least one cutting die associated with a respective one of the shapes onto the work-piece may be included. Instructions for controlling cutting of the work-piece into the pieces of product may be included. Instructions for controlling cutting include instructions for controlling a computer numerically-controlled (CNC) machine may be included.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for computer-assisted cutting processes. The techniques disclosed provide for, among other things, improved yield of finished product from raw materials, decreased time needed to develop efficient layout strategies, and increased productivity of cutting operations. Among other things, the computer-assisted cutting processes provide for efficient use of resources by separating development of nesting strategies from the production line.

In exemplary embodiments disclosed herein, the raw materials include leather hides. The computer-assisted cutting processes provide for processing of individual leather hides. The teachings herein are not limited to use with a leather hide, and therefore the term "work-piece" is generally interchangeable with the term "hide."

Figure 1:
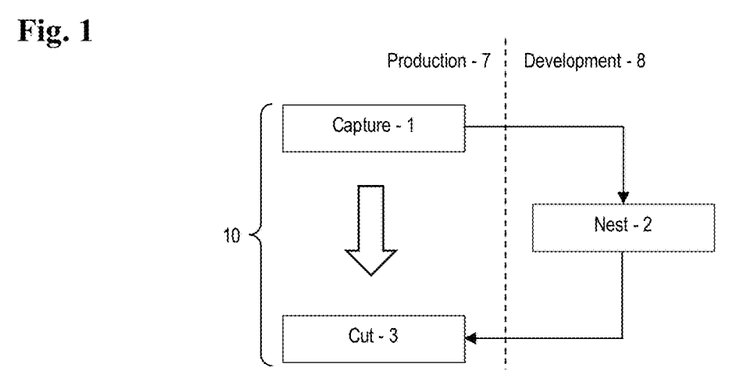
FIG. 1 is a flow chart depicting an exemplary process for performing cutting operations.

Turning now to FIG. 1, a flowchart depicting an exemplary method for cutting operations 10 is provided. Aside from depicting aspects of an exemplary method for cutting operations 10, FIG. 1 shows there is a separation between a production environment 7 and a development environment 8. That is, by implementing the method for cutting operations 10 as depicted in FIG. 1 and described throughout this disclosure, operations of the production environment 7 may be substantially expedited, while results provided by the development environment 8 are substantially more useful to system operators.

Generally, it may be considered that the production environment 7 includes a facility where handling of work-pieces is performed. The development environment 8 may be a facility that is remote from the production environment 7, and provides nesting strategies or actual nested job files according to the teachings herein.

A first stage 1 of the exemplary method for cutting operations 10 is completed in the production environment 7. During the first stage 1, a capture process is completed. Among other things, the capture process involves imaging of a work-piece and recording imaging information.

The imaging information developed in the capture process may consider a number of parameters related to the work-piece. The capture process may include inspection of the work-piece. Generally, inspection involves identifying flaws and defects in the work-piece. This may include identification and/or evaluation of differences in color, differences in texture, physical defects such as branding, scars, tears, differences in thickness, and other such attributes. Additionally, users may interact with the system during the capture process. For example, defect marking may be completed during the capture process. Generally, defect marking may involve marking defects with tape or markers to identify unusable areas. Some defects may be judged as usable and incorporated in less noticeable areas. Usable defects may be graded according to one of several grades as specified by a customer. Each work-piece to be cut may call for perfect leather or allowable "less than perfect" leather over the entire part or some region thereof according to the customer pre-determined quality rules. Alternatively, defect marking can be done virtually without physically marking the hide. For example, defect marking may be completed with a digitizing system that includes defect information other imaging information.

The capture process further includes scanning of the work-piece. Generally, scanning is performed to determine the outer perimeter shape of the work-piece and the size and relationship of all defects. In the case of physically marked hides, a camera may be used to identify the hide shape and all physical marks. In the case of virtual marks, the hide perimeter map may be superimposed onto a virtual defect map. In either case, the result is a map that identifies the overall size and shape of perfect leather, unusable areas, and one or more levels of usable areas with restrictions.

A second stage 2 of the exemplary method for cutting operations 10 is completed in the development environment 8. Generally, the second stage 2 makes use of the imaging information as well as a job description and other such information for processing and development of at least one nesting strategy.

In the second stage 2, a computing system provides for development of nesting strategies. One of the advantages of implementing a remote system is the ability to perform the second stage 2 separately from production. More specifically, information collected from the capture process may be sent to the remote system for processing. In some embodiments, capture may take place at a remote (development or other) station and hides and nesting strategies are submitted to the production environment 7 for processing. While the remote system continues with development of nesting strategies, users may continue with operations such as additional imaging operations or cutting operations. Accordingly, dramatic reductions in down time are realized by the processing system disclosed herein.

Once the capture process is completed, a remote computer may develop at least one nesting strategy by making virtual arrangements of parts contained in a list of required parts specified by a production work order. Most often, the number of parts in a given production work order will greatly exceed the available area in a single hide, so parts are logically placed on the first hide and the remaining parts in the work order are then placed on subsequent hides until the production work order may be fulfilled. The process may be performed real-time according to rules defined by customer practices and quality standards. One of the common goals for a nesting strategy is to increase yield from the material and to produce parts per quality specification in a reasonable amount of time. Development of nesting strategies turns out to involve an analysis of yield versus time since, in general, yields increase with the number of different trials completed, however there is a point of diminishing return. By developing nesting strategies in the development environment 8, very little time is spent with development of nesting strategies in the production environment 7. As a result, there is a minimal impact on productivity.

In order to provide desirable nesting strategies, the development environment 8 will consider a variety of inputs (such as some of the foregoing parameters) and make virtual cutting patterns for cutting the work-piece into a plurality of product pieces. The efficacy of any given pattern is compared to various user criteria, such as a requirement for yield. Each trial for development of a nesting strategy might vary one or more of a dozen nesting variables such as rotation angle, size bias, shape bias, perimeter buffer, and the like for any given part. Each unique set of nesting variable responses constitute one nesting strategy. For a typical cutting operation, there may be over seven (7) million unique strategies. Accordingly, the development environment 8 proceeds with iterative calculation and comparisons to arrive at suggested nesting strategies.

Once a nesting strategy is complete for a given hide, it may be presented to a user. In some embodiments, the user is presented with a plurality of suggested nesting strategies from which to choose. The user will select an appropriate nesting strategy which will then describe orientation and layout of parts on the work-piece. Once the parts have been laid out on the work-piece in a nesting process, the parts are cut, the table is cleared and another hide is selected for cutting operations 10. As with the prior work-piece, parts are then nested from the remaining list in the work order and the process is repeated until the work order is compete.

Remote development of the nesting strategy permits users to evaluate customer data and optimize the strategy selection remotely without affecting production. Remote development of nesting strategies using representative work-piece (or actual work-pieces selected for production) and jobs specific to each customer can be run remotely on massively parallel computers (computer farms) resulting in much quicker processing than on a customer computer, thus allowing for many more test nesting strategies to be evaluated. Once the evaluation operation is complete, a small number of nesting strategies may be returned to the customer. Ostensibly, the selected nesting strategies offer the best material yields across a range of customer jobs.

In a third stage 3 of the exemplary method for cutting operations 10, cutting of the work-piece is performed. The cutting is performed according to the nesting strategy developed in the second stage 2. Generally, cutting operations 10 may be performed in the production environment 7 with a computer numerically-controlled cutting (CNC) machine and/or traditional cutting dies.

Nesting applies a strategy to a specific set of work-pieces for a specific set of parts. In some embodiments, a nesting operation is equivalent to the cutting operation 10. For example, where the computer numerically-controlled cutting (CNC) machine is used, the patterns to be followed for cutting are established in the computer controller, and guide the cutting operation 10. In other embodiments, such as those involving traditional cutting dies, the nesting operation may involve distribution of the cutting dies onto the work-piece according to the nesting strategy prior to sending the work-piece to a press.

In order to perform cutting of the work-piece, in some embodiments, the customer will set up several computers run one of the selected strategies on each computer in parallel for every job. The "winning" strategy is selected and used for nesting that job. The next job may be sufficiently different that another strategy might produce a better yield. Therefore, the next job will repeat the parallel nesting to determine the best yielding strategy for that job from the handful of strategies supplied from the development environment 8.

In some of these embodiments, a small number of strategies are selected from the millions of possible combinations based on customer supplied data. It would take months or years to identify these strategies if done serially on the customer production computer. With remote massively parallel computer power, nesting strategies may be returned to the customer in a matter of hours or days. As the customer's jobs change, new nesting strategies can be identified to assure continued yield optimization. However, the actual nesting and/or cutting operations still occur at the customer site and remains within the work flow. Depending on the complexity of the job, nesting, while optimized due to pre-selected strategies, still consumes process time and may govern the total system throughput.

As implied in FIG. 1 by the separation of the production environment 7 from the development environment 8, the separate or "offline" development of nesting strategies provides for personnel in the production environment 7 to concentrate on labor intensive tasks such as capture and cutting, while calculational tasks (i.e., development of nesting strategies) are performed remotely and do not substantially impact the rate of production.

In order to provide some context for the teachings herein, some terms are now introduced.

As referred to herein, a "leather work-piece" or "leather hide" or other similar terms generally refer to pieces of material that are to be subdivided through a cutting process. The cutting process may involve computer numerically controlled (CNC) machines, traditional dies, and other techniques as deemed appropriate. The techniques disclosed herein are not limited to use with leather, nor is it limited to work-pieces of particular shapes or sizes. Neither are the techniques disclosed limited to use with flat or generally planar stock. Generally, the techniques disclosed are advantageous for minimizing waste from subdividing material characterized with an irregularly shaped periphery. In short, the embodiments disclosed herein are merely illustrative of techniques for subdividing material. That is, as discussed herein, the term "work-piece" generally refers to a sheet of natural and/or synthetic material from which products are to be fashioned. In some embodiments, the work-piece is a generally flexible thickness of material that is oddly shaped (has an irregular periphery). In the exemplary embodiments, the work-piece is a leather hide, such as from a cow. In some other embodiments, the work-piece is a generally flexible thickness having a regular geometry, such as material dispensed as roll-goods.

Generally, in cutting operations as discussed herein, a work-piece is broken down into a plurality of different pieces referred to as "product" or "parts." In exemplary embodiments, each product is cut from the work-piece by a CNC machine. In other embodiments, the product is cut from the work-piece with a cutting die. In simple terms, a cutting die is a device similar to a cookie-cutter. That is, a cutting die is generally a device providing an outline of a particular product. Each cutting die includes an edge that is adequate for separating a product from the work-piece when the respective cutting die is pressed into the work-piece.

Determination of the yield includes calculation of interstitial material (material left between the associated shapes) and comparison of the total area of interstitial material to the total area of the work-piece. Reaching a desired strategy generally involves iteratively changing associations of the shapes with the work-piece to provide for increased product yield. The yield may be considered as one measure of efficiency of the leather processing system.

Processing of the work-piece generally requires adoption of a nesting strategy for cutting the work-piece into a plurality of products. As discussed herein, a plan or strategy for orienting the shapes of the pieces of product is generally referred to as a "nesting strategy." Arranging a pattern for cutting the work-piece according to a given nesting strategy is generally referred to as "nesting."

Remote development of nesting strategies allows for adoption of "just in time" strategies for changes in production. The remote facility can also have substantially more computing power than any customer is likely to have onsite. This allows for improved production rates and an increased number of possible solutions. By maintaining a remote facility, system performance may be more closely monitored and adjusted. That is, for example, by having a remote facility that is central to a few operations, it is possible to maintain engineering staff and other resources not available in a typical cutting operation. With the availability of greater resources, the remote facility may be equipped to perform more sophisticated analyses such as regression analysis to set the direction for searching strategies, which would not be available in a typical production environment.

Aspects of a processing system suited for implementing the method for cutting operations 10 are provided below and with reference to FIGS. 2-8.

Figure 2:
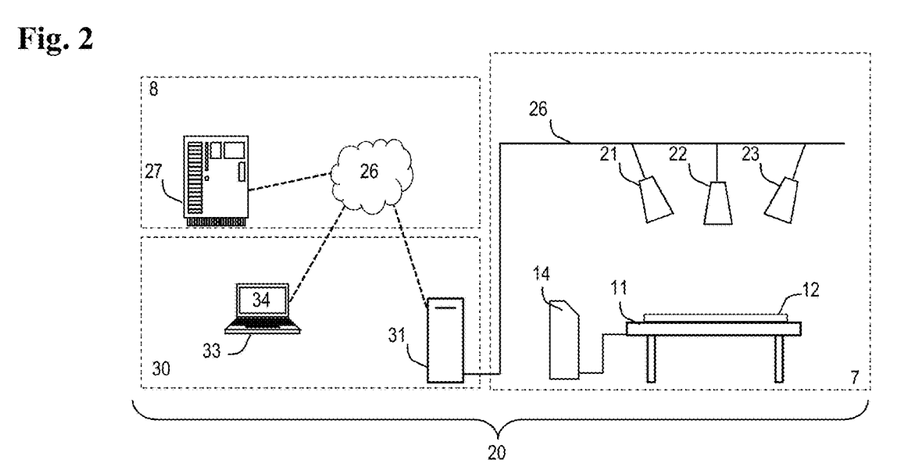
FIG. 2 is a schematic diagram depicting aspects of an exemplary embodiment of a system for a computer assisted cutting operations.

Referring now to FIG. 2, an exemplary embodiment of a processing system 20 is shown. In this exemplary embodiment, the processing system 20 generally includes a production environment 7, a development environment 8, and a control system 30. Aspects of each of the production environment 7, the development environment 8, and the control system 30 are now introduced.

In the exemplary embodiment, the production environment 7 includes a table 11 upon which a work-piece 12 is disposed. Generally, the work-piece 12 includes a substantially flat and smooth thickness of material. In the exemplary embodiments discussed, the work-piece 12 is a leather hide, such as a leather hide from a cow. Other material may be used for the work-piece 12 as deemed appropriate. The table 11 may include appropriate equipment for implementation of a computerized numerically controlled (CNC) machine 14.

The production environment 7 may include illumination 21. The illumination 21 may include any form of lighting system deemed appropriate. For example, illumination 21 may include at least one spotlight, track lighting, fluorescent lighting, and other such forms of illumination. Generally centered over the table 11 is an imaging device 22. The imaging device 22 may include any type of device deemed appropriate. For example, the imaging device 22 may include at least one camera (such as a camera with a charged coupled device (CCD) or complimentary metal oxide sensor (CMOS) that includes a two-dimensional array of pixels). Further, the production environment 7 may include at least one projector 23. In some embodiments, the projector 23 is an optical guide such as at least one laser. The laser may be driven by the control system 30 and provide users with an optical display on the work-piece 12. Components of the production environment 7 may communicate with the control system 30 through network 26.

In the exemplary embodiment, the development environment 8 includes substantial computing resources. The substantial computing resources may include a plurality of individual computers, at least one server, and other such components. Merely for purposes of referencing, the substantial computing resources maintained within the development environment 8 are simply referred to as "remote computer 27." Generally, remote computer 27 receives input information from the control system 30 and develops at least one nesting strategy. The development environment 8 is configured to communicate with the control system 30 through a network, such as network 26. The development environment 8 may include resources commonly available in a computing infrastructure for execution of assigned tasks, exemplary embodiments of which are introduced further herein.

The control system 30 generally includes a controller 31. The controller 31 may be coupled to a workstation 33 either directly, or through network 26. The workstation 33 includes user interface 34. The control system 30 generally provides computing capabilities that may be distributed or shared between the controller 31, the development environment 8, the workstation 33 and further components (not shown) such as those that may be accessed through network 26. Generally, the control system 30 provides for control of imaging operations, nesting operations, and cutting operations. Accordingly, the control system 30 communicates with the development environment 8. The control system 30 may include a direct link to the development environment 8 and/or communicate through the network 26. Further, the control system 30 may communicate with user databases that contain, for example, descriptions of production requirements.

Resources available in a computing infrastructure and as may be used with the development environment 8 as well as the control system 30, are now introduced. These resources, as well as others, may include dedicated and/or shared components. That is, at least some of the resources available to the processing system 20 may be shared between the production environment 7, the development environment 8 and the control system 30.

Generally, computing resources include one or more central processing units (processors). Processors are coupled to system memory and various other components via a system bus. Read only memory (ROM) is coupled to the system bus and may include a built-in operating system (BIOS), which controls certain basic functions of the control system 30.

The user interface 34 may be configured with various components such as a display adapter and/or the display. Included may be a graphics adapter to improve the performance of graphics intensive applications, a video controller, a capacitive (i.e., touch screen) display, and the like. Input/output devices are shown as connected to system bus via user interface (UI) adapter. A keyboard, a pointing device (e.g., a mouse), and speaker may be included and interconnected to system bus via user interface adapter. Other user interface components may be included as deemed appropriate.

The computing resources may be powered by a suitable power supply. In some embodiments, the power supply includes at least one transformer for receiving alternating current (AC) and transforming the AC into a suitable form of direct current (DC). In other embodiments, the power supply includes at least one battery. The power supply may include appropriate circuitry for receiving and controlling various forms of input power.

In some embodiments, various adapters may be connected to one or more I/O buses that are connected to system bus via an intermediate bus bridge (not shown). Suitable I/O buses for connecting peripheral devices such as hard disk controllers, network adapters, and graphics adapters may include common protocols, such as the Peripheral Components Interface (PCI) bus.

In this example, a communications adapter interconnects system bus with network 26 enabling the control system 30 and the development environment 8 to communicate. The communications adapter may be supportive of at least of one of wired and wireless communication protocols. For example, the communications adapter and network 26 may support protocols such as wired Ethernet, wi-fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter communicates with network 26, and may communicate (directly or indirectly) with the Internet.

The computing resources may include at least one input/output (I/O) adapter and/or a communications adapter coupled to the system bus. I/O adapter may include parallel ATA (PATA, also called IDE or EIDE), Serial ATA (SATA), SCSI, Serial Attached SCSI (SAS), and Fibre Channel, or include any other type of interface deemed appropriate. The I/O adapter generally provides for communicating with a hard disk and/or long term storage unit (such as an optical drive, tape drive) or any other similar component. I/O adapter, hard disk, and long term storage unit (and other similar components as may be included) are collectively referred to herein as "mass storage."

Data may be stored in any type of database deemed appropriate, and manipulated with appropriate tools. For example, images, as well as the shapes and inventory of available cutting dies may be stored in databases such as ORACLE provided by Oracle Corporation, of Redwood Shores, Calif.; SQL SERVER from Microsoft Corporation of Redmond, Wash.; and SYBASE of SAP Corporation of Dublin, Calif. Additionally, data libraries as may be generated herein (discussed below) may be managed accordingly.

Generally, the computing resources include machine readable instructions stored on a machine readable media (such as in ROM, RAM, or in the mass storage unit). The machine readable media may be referred to as "non-transitory" media. The machine readable instructions (referred to herein as "software," as an "application," as a "client, a "process," a "plug-in" and by other similar terms) generally provide for functionality as will be discussed in detail further herein.

Some of the machine readable instructions on machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

Additional machine readable instructions on machine readable media may be used with the processing system 20. Some of the additional systems may include commercially available software, such as drawing or computer aided design (CAD) applications. Some of the additional systems may be integrated with the processing system 20 such that seamless operation is provided to the user. Accordingly, the processing system 20 may have at least one interface for interfacing with ancillary software or systems.

The computing resources may include, or exclude, as appropriate, the foregoing components and other components. For example, other components such as routers, bridges, firewalls, switches, servers, middleware and other components may be available.

In some embodiments, at least some aspects of the computing resources, in particular components for the development environment 8, may be designed and configured for stationary operation. In some other embodiments, at least a portion of the computing resources are designed and configured for mobile operation. Some exemplary embodiments of commonly available mobile computers that may be suited for practice of the teachings herein include laptops, smartphones, tablets and the like.

The computing resources may include a plurality of computers (such as personal computers, tablets or the like). For example, in the development environment 8, at least one computer may include substantial storage, memory, processors, mass storage and the like. As a further example, in the control system 30, at least one computer may be designed with mobility as a primary purpose.

A particular computer may be purpose-oriented. For example, one computer may be used to operate principally as a user interface. One example includes a tablet type of computer available to an operator at the production environment 7. Another example would be a stationary computer that includes substantial processing capabilities.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computing resources, and systems making use of or incorporating the computing resources, merely provides an environment for the teachings herein and is not to be construed as limiting, but as illustrative of aspects of the processing system 20.

Figure 3:
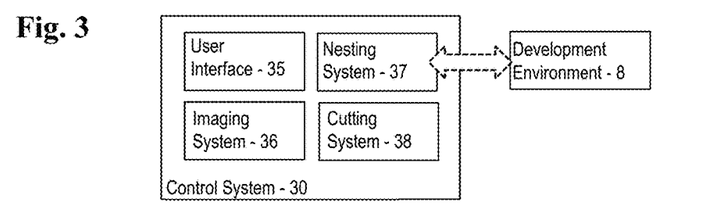
FIG. 3 is a schematic diagram depicting aspects of an exemplary embodiment of a control system for the system of FIG. 2.

The control system 30 may be divided into certain purpose-oriented sub-systems. As shown in the example of FIG. 3, subsystems of the control system 30 may include a user interface system 35, an imaging system 36, a nesting system 37, and a cutting system 38. Physical components such as hardware and/or software may be multipurpose, and used within the various subsystems of the control system 30 as needed. For example, the illumination 21, imaging device 22, and projector 23 may be used within the imaging system 36 as well as the cutting system 38. Accordingly, describing aspects of the control system 30 in terms of subsystems is not to be construed as limiting of the architecture of the leather processing system 20.

In general, the user interface system 35 provides a facility for all external interfacing. The user interface system 35 may include communications equipment, software, data storage and other components. The user interface system 35 may receive manual inputs and/or remote inputs and provide those inputs to the other systems in the control system 30. The user interface system 35 may receive information from the control system 30 and output to a user, a network or another system.

In general, the imaging system 36 manages imaging operations. The imaging system 36 may receive instructions, such as from the user interface system 35 and control imaging accordingly. The imaging system 36 may produce output that includes, without limitation, a map of a work-piece and a defect map.

The nesting system 37 receives information and communicates with the development environment 8 to obtain nesting strategies. In general, nesting includes taking the specifications provided in a nesting strategy for a particular job description and overlaying the associated shapes onto an image of the work-piece. The nesting system 37 may implement a sub-system referred to as a "library module." Generally, the library module collects nesting information on an ongoing basis and builds a knowledge base (referred to as a "library"). By applying knowledge derived from prior tasks, the nesting system 37 may substantially expedite and enhance processing.

Exemplary information received by the nesting system 37 includes a map of a given work-piece, defect information, grading information, size and shape information, a job description, and user bias information such as limitations on computing time or requirements for yield. The nesting system 37 includes a processing unit that produces output. The output includes information regarding arrangement of parts as well as other information such as associated yield, computation time, library information and other related information.

In general, the cutting system 38 receives information and facilitates cutting operations. The cutting system 38 may program CNC machine 14, and may project a selected nesting strategy onto a work-piece 12 for review by a user. In embodiments where cutting dies are used, the cutting system 38 may facilitate manual placement of cutting dies (for example, by projection of die codes onto the work-piece), may provide for automated placement of cutting dies (for example, by governing robotic operations), control of a cutting system (such as a press) and may perform other similar functions. In some embodiments, the development environment 8 may control the cutting system 38. For example, the development environment 8 may control the cutting system 38 when a computer numerically-controlled cutting (CNC) machine is included.

In some embodiments, aspects of the nesting system 37 and the cutting system 38 are contained within a single system.

Further aspects of the processing system 20 and the various subsystems thereof are discussed in greater detail below.

Figure 4:
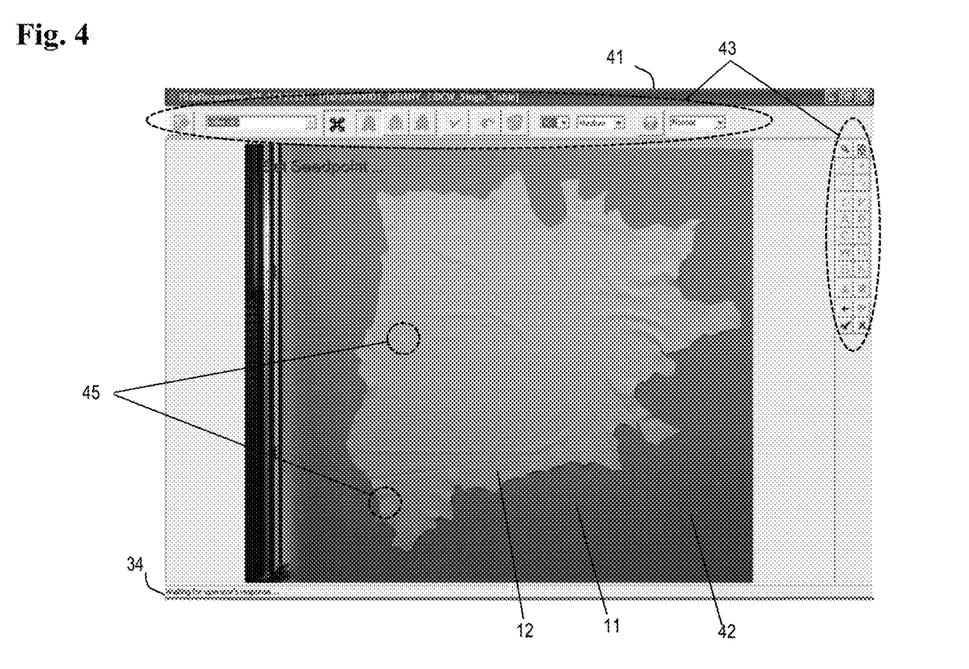
FIGS. 4 and 5 are graphics depicting aspects of a display (display graphics) of the system shown in FIG. 2, where the display depicts imaging of a leather hide.
Figure 5:
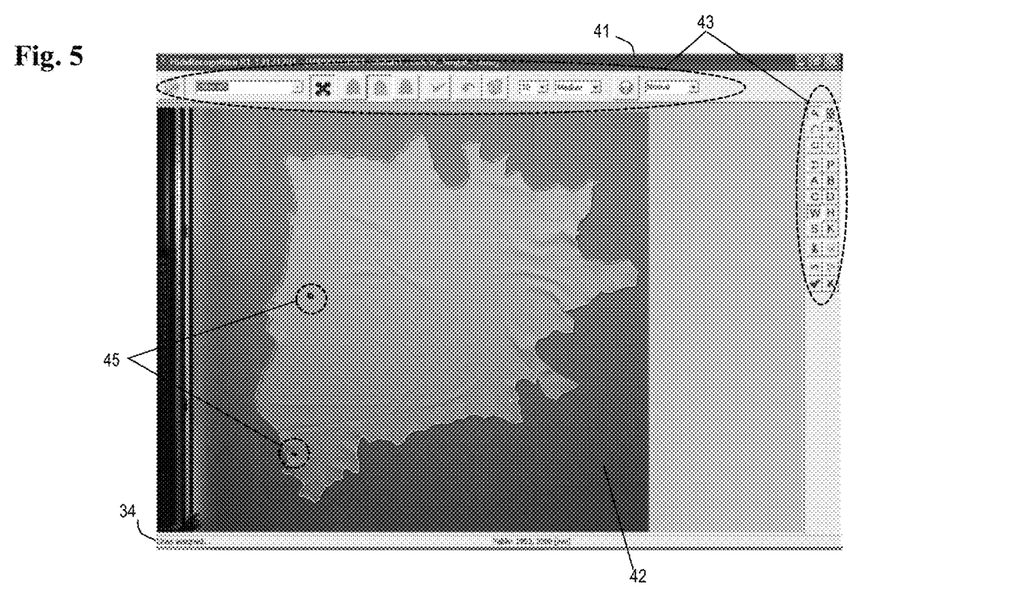

Turning now to FIGS. 4 and 5, an exemplary display screen 41 of software implemented by the processing system 20 is shown. In this example, the display screen 41 is provided on the user interface 34 of the control system 30. The display screen 41 includes a display area 42 and at least one toolbar 43. The display area 42 provides a display of an image of the work-piece 12. In this embodiment, the image has been collected by the imaging device 22. As may be seen, the table 11 may present a contrasting background to aid with imaging of the work-piece 12.

At least one seed-point 45 may be disposed on the work-piece 12. Generally, the at least one seed-point 45 is provided as a reference mark on the work-piece 12. In some embodiments, such as where a plurality of seed-points 45 are used, the control system 30 may calculate geometric considerations of the work-piece 12. Aside from providing for determinations regarding size of the work-piece 12 the seed-point 45 may be used to provide a reference point for commencing of cutting operations. At least one seed-point 45 may be placed on the work-piece 12 with an invisible marking (such as with a reflective anchor that operates in the infrared), a visible marking (such as with an erasable ink, or by placement of an intermediate device such as a reflector). As an alternative, at least one seed-point 45 may be associated with the work-piece 12 through operation of the software.

In the embodiment shown, a user is provided with the image for review and setting of each seed-point 45. In FIG. 4, the user has selected two places for placement of respective seed-points 45. In FIG. 5, the user has registered those selections with the software through selection of appropriate settings in the toolbars 43. Generally, this initial stage is a part of the capture stage.

If the user so desires, during the capture stage, specific defects and other features of the work-piece 12 may also be highlighted and graded. Grading may be performed to designate preferred usage of the highlighted area. For example, a defect may be graded to exclude a defect (such as a perforation in the work-piece 12). As another example, a defect may be graded to limit the area to use for products that are known to be in less visible areas. As a further example, a high-quality portion of the work-piece 12 may be graded for premium usage. Highlighting and/or grading may be performed by the user, and/or by control system 30 (such as by use of algorithms). For purposes herein, identifying defects on the work-piece and associating those defects with an image of the work-piece results in a "defect map." Similarly, grading areas of material of the work-piece and associating those grades with an image of the work-piece results in a "grade map" or a "grading map." The defect map may be combined with the grading map as deemed appropriate.

Figure 6:
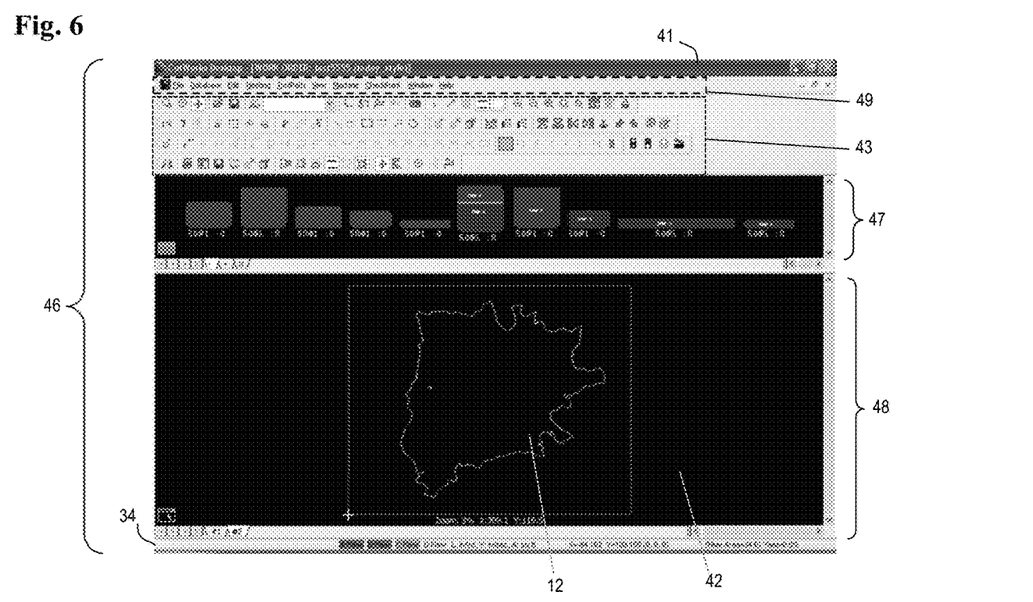
FIGS. 6 and 7 are display graphics depicting tools for cutting the leather hide of FIGS. 4 and 5; and, FIG. 8 is a display graphic depicting a nesting strategy for cutting operations.

Referring now also to FIG. 6, once the seed-points 45 have been registered, a nesting tool 46 may be displayed. In the example provided, the nesting tool 46 includes a product selection menu 47 and a work area 48. Additionally, pull-down menu 49 may be included. Pull-down menu 49 may include user selectable tools for controlling the software. For example, pull-down menu 49 may provide users with options to open or close files, manipulate database objects, perform nesting operations, initiate cutting operations and the like. Pull-down menu 49 is not limited to association with the nesting tool 46, and may appear on other screens of the software. In some embodiments, the appearance of pull-down menu 49 is context-sensitive. The nesting tool 46 may also include at least one toolbar 43 that include buttons for execution of specific instructions. That is, options presented within each toolbar 43 provide for execution of a given function whereas options presented under pull-down menu 49 may lead users to additional options and ultimately to a specific function.

Inherent to processing of any one given work-piece 12 into product (i.e., pieces to be cut from the work-piece 12), a user will have identified the various pieces of product that are desired from the work-piece 12. That is, a user will have created or been provided with a job description. Each job description (or "job") will include a shape and size in association with each product for cutting the respective product from the work-piece 12.

Once the user has identified a particular job for processing of the work-piece 12, the nesting tool 46 will identify all product requirements for completion of the job. In this embodiment, the product selection menu 47 provides a graphic presentation of the shape associated with all of the products identified in the job, as well as a count of number of respective products and may include other similar information. In some embodiments, the product selection menu 47 is interactive. That is, for example, elements presented in the product selection menu 47 may be highlighted and associated with operations for cutting of certain grades of material within the work-piece 12. For example, a user may right-click on a particular graphic element within the product selection menu 47, and a left click to produce a pop-up menu. The user may select a particular grade of material for work product to be produced by the selected profile.

In some embodiments, the user may drag images from the product selection menu 47 and place them onto the image of the work-piece 12 provided in the work area 48.

In some embodiments, the nesting tool 46 displays the work area 48 as an outline image (as shown in FIG. 6). In some other embodiments, the work area 48 is depicted with regions shaded according to particular grading. Other presentations of the work-piece 12 within the work area 48 may be realized.

As one can surmise, making efficient use of the material within the work-piece 12 can be a daunting task. Accordingly, remote processing may expedite this task by iterative evaluation of the geometry of each product specification within the job against the shape of the work-piece 12 separately from the time constraints imposed by production. Various aspects of nesting operations with the processing system 20 are now introduced.

Generally, the processing system 20 may be used to map product requirements against the work-piece 12. That is, to generate the nesting strategy. One goal of the nesting strategy may be to provide for improved production yield or reduced leftover material. A nesting strategy may be devised in a variety of ways. For example, a nesting strategy may be developed on a completely automated basis, a semi-automated basis, or on a manual basis.

Figure 7:
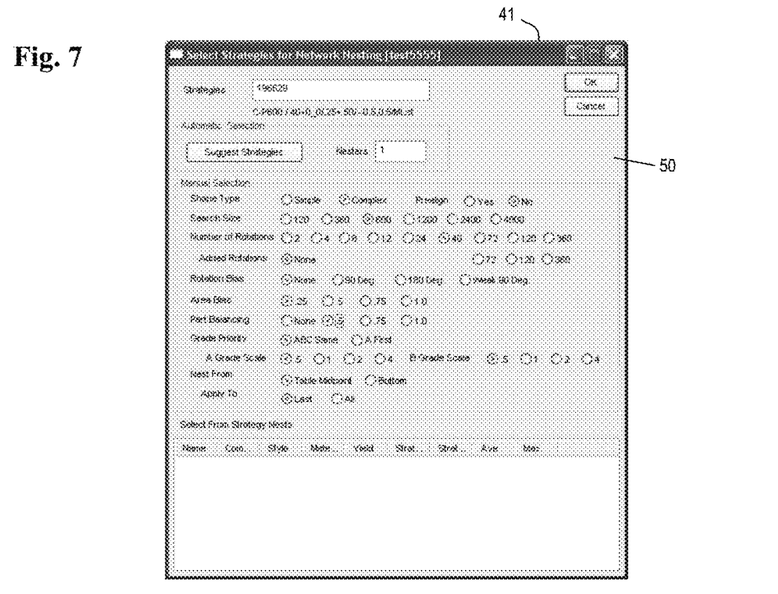

As an introduction to the nesting process, in one embodiment, once a user has completed capture of an image of the work-piece 12, and identified an appropriate job, then the user may task the development environment 8 with responsibility to determine placement of the product on the work-piece 12. Reference may be had to FIG. 7, where an exemplary nesting menu 50 is provided.

Figure 8:
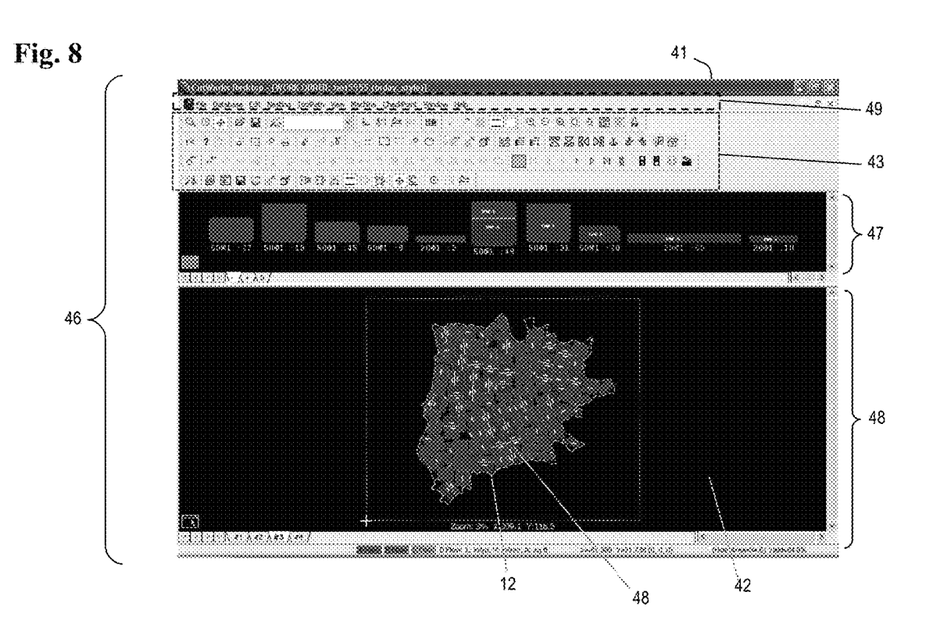

In the example provided in FIG. 7, the user may request automated determination of an appropriate nesting strategy by simply clicking on a button captioned "Suggest Strategies." Once the user has requested automated development of the nesting strategy, the development environment 8 will commence determination of a nesting strategy. In some embodiments, the suggested nesting strategy is presented in the work area 48, as depicted in FIG. 8.

Determination of the appropriate nesting strategy may be accomplished by a variety of techniques. With regards to automated nesting, the software may be configured to any one or more of particular biases. For example, the software may be configured to identify the largest pieces of product desired, and to map the large products against the image of the work-piece 12 first. For example, there may be a bias to place large products in the center of the work-piece 12. In another embodiment, the software may be configured to consolidate simple geometries. For example, if a job has a variety of products having a square or rectangular shape, it may be considered advantageous to consolidate square and/or rectangular shapes together in a central portion of the work-piece 12, thus minimizing interstitial space (that is, space between each product to be cut from the work-piece 12).

A variety of additional considerations for initiating and determining a nesting strategy may be realized. As an example, a given nesting strategy may take into account the foregoing as well as requirements for grading of the work-piece 12. Of course, the user may intervene in the process and provide for manual cutting.

Nesting strategies may be limited to a single work-piece 12, or may be developed for a plurality of work-pieces 12. That is, a large job may not be completed by a single work-piece 12. It may be considered appropriate to use work-pieces 12 of varying grades, shapes and/or sizes in order to complete the particular job. An appropriate nesting strategy may be developed for the large job that develops a single and unique nesting strategy for each one of the plurality of work-pieces 12. That is, the single nesting strategy may include separate instruction sets for each work-piece 12 within the plurality of work-pieces 12.

Generally, processing associated with development of the nesting strategy is provided by the development environment 8. For example, the controller 31 may collect descriptive information for at least one work-piece 12. The descriptive information may include, for example: an image of the work-piece 12, a defect map of the work-piece 12, and the item number for the work-piece 12 (such as a serial number that may be associated with each one of a plurality of work-pieces 12) and the like. A particular job may also be defined and associated with the at least one work-piece 12. The at least one job and the descriptive information associated with the at least one work-piece 12 may be transferred to the development environment 8 as input information. The development environment 8 will then use the input information to provide a desired number of suggested nesting strategies. The nesting strategies may be provided according to the user limitations and/or input. Among other things, remote development of nesting strategies offers users with improved availability of the controller 31. That is, by proceeding with remote development of nesting strategies, the controller 31 has much greater availability to concentrate on less time-consuming tasks such as capture, layout and cutting.

Various techniques may be employed for development of a nesting strategy. In one embodiment, development of the nesting strategy begins with the job description, the descriptive information for the work-piece 12 (i.e., mapping of the work-piece 12) and the at least one seed-point 45. The user may input certain guidance or biases as well. The development environment 8 may then develop (or the user may provide) an initial nesting strategy. Subsequently, the development environment 8 will develop two variations of the initial strategy (referred to as a "first" strategy and as a "second" strategy). Determinations regarding the value of the first strategy and the second strategy are made. For example, a determination of the yield associated with the first strategy is made, as well as a determination of the yield associated with the second strategy is made. More than one aspect of the resulting nesting strategy may be used in determination of a preferred strategy. At least one of a comparison, a statistical analysis (such as a regression analysis) and other method is used to assess whether the first strategy or the second strategy is the preferred strategy. Once the preferred strategy has been selected, then the process is repeated. Repetition of strategy development and selection continues until user criteria are reached. Exemplary user criteria may include the yield, processing time, convergence of testing results (i.e., yield of the last nesting strategy is substantially similar to yield for the most recently developed strategy).

In some embodiments, the user is provided with a plurality of options for nesting strategies. That is, in at least some instances, it is possible to have more than one nesting strategy that meets criteria established for a particular job.

In some embodiments, the processing system 20 makes use of user libraries. By implementing user libraries, the processing system 20 may categorize nesting strategies, thus providing a supply of previously computed nesting strategies. By using an appropriate previously computed nesting strategy (a "seed-strategy"), the processing system 20 may start computations with a nesting strategy that will be close to a final strategy, thus reducing the time required for iterative computation for a particular job.

That is, in some embodiments, once a request for a nesting strategy has been submitted, the nesting system 37 will store associated information in a user library. Information stored may include layout of the nesting strategy along with associated information, such as hide geometry, defect maps, job requirements, yield, processing time (both for computation and processing) and other such information. The knowledge base may be indexed according to any of the various stored parameters deemed appropriate. The processing system 20 may then draw on a similar strategy as the seed-strategy to commence processing for the given job.

By taking advantage of user libraries, the processing system 20 continually improves in efficiency. Whether efficiency is measured as a function of yield, time required for development of a nesting strategy, or the time required for implementation of a nesting strategy, use of user libraries can provide for continuing, incremental enhancements to productivity.

By performing remote processing, the processing system 20 substantially increases availability of system resources. Where multiple processing systems 20 are used, having a central development environment 8 provides additional advantages. For example, the building of user libraries may be expedited. Additionally, existing user libraries may be employed for newly commissioned processing systems 20. Further, adjustments and updates to processing techniques may be greatly facilitated by having a central system.

In general, testing of various nesting strategies is a trial and error process. At best, testing is much too time consuming to be performed in the production workflow. This results in sub-optimal material yields due to lack of sufficient time for trials comparing nesting strategies. In the prior art, it is not uncommon for a CNC cutter operator to select a single strategy and use it for all materials regardless of material shape, defect load, or cut part shape.

Software may be used to test nesting strategies in parallel wherein the "winner" of the nesting strategy material utilization test is used for the actual part placement (nesting) and subsequent cutting (or simultaneous cutting, in the case of CNC, for example). Accordingly, the teachings herein provide a means to use a representative sample of cut part (jobs) and materials to perform the testing of various nesting strategies "off-line" from the production workflow. The optimal nesting strategy may be determined outside of the Scan-Nest-Cut workflow and when used, will supply the best material utilization in the least amount of time allowing for optimization of the production workflow.

In some embodiments, a customer first submits representative samples of CAD data for production jobs and material scans to central nesting bureau. Once drawings of been submitted, a remote system such as the development environment performs nesting testing to identify a number of preferred nesting strategies. Since the nesting testing evaluation is done in the development environment and is not part of the workflow for the production environment, any number of computers (cloud, PC, Mini, supercomputer, etc.) may be used. Processing in the development environment may proceed around the clock, using heuristic algorithms or any other techniques deemed appropriate to converge on strategies that deliver the optimal combination of material yield and nesting time for each specific customer's data/material set. Subsequently, the customer receives a number of nesting strategies based on the variability of the supplied data/material. The customer may then use a number of computers (1-N) within the production environment to nest the N supplied nesting strategies in parallel to thus determine the "best fit" for each production job. As the nature of the customer's work changes, new data/material scans are supplied to the development environment where they may be re-tested on a continuing basis, new and updated nesting strategies may be submitted to customer.

Accordingly, the teachings herein provide for identification of efficient nesting strategies that are separate from nesting operations. A customer merely needs to provide scanned hide data and parts to be cut in a given work order to a remote nesting service. The customer data may be supplied for cutting some date in the future or could supplied on a "Just-In-Time" basis. The remote nesting service processes the data through a series of algorithms to quickly optimize the nesting of parts across all of the supplied hide data returning the actual nested cut file to the customer. As a result, nesting is completely removed from the workflow and the production environment of the customer is unencumbered by the nesting operation. The customer runs the supplied cut file and is assured of substantial increases in productivity.

As intimated by the foregoing, in some embodiments, a customer may own and operate the production environment seven, while the development environment 8 is provided as a service by another party.

Referring back now to FIG. 7, additional aspects of the nesting menu 50 are reviewed. In this exemplary embodiment, the user may incorporate a number of biases into development of the nesting strategy. Exemplary parameters for weighting of the nesting strategy include: shape, alignment, size, area, grade, and distance from a point (such as seed-point 45, a middle of the work-piece 12 or other similar point). Accordingly, a user may set guidelines for nesting strategy by using the nesting menu 50 as well as the nesting tool 46.

Additionally, the nesting menu 50 may provide users with input parameters for controlling iterative development of the nesting strategy. Examples include controlling: a number of rotations of a cutting die (where dies are used), a rotation bias, an area bias, a part balancing, a distribution, and other such factors.

In some embodiments, users may control efficiency of nesting strategy estimation. That is, a user may be satisfied with 97% consumption of the work-piece 12. Once a nesting strategy has been determined that meets this standard, the nesting strategy is presented to the user. Remote development of a nesting strategy offer users the highest material yield in the fastest time. This saves the user from adopting a sub-optimal nesting strategy due to time constraints or other considerations. In another embodiment, the user may identify that a nesting strategy is needed within a certain period of time. For example, the user may be presented with the best nesting strategy determined within ten minutes.

Having thus described aspects of an exemplary embodiment, some additional aspects and embodiments are now introduced.

In some embodiments, the control system 30 is configured to provide a user interactive system for layout. For example, the projector 23 may be used to provide at least one icon as an image on the work-piece 12. Feedback to the control system 30 may be provided through hand gestures or other input mechanism such as reflective the spices disposed on the work-piece 12. Accordingly, the imaging device 22 may be used to assist users with providing feedback during the capture and/or nesting procedures.

In some further embodiments, the development environment 8 may operate software that includes an appropriate algorithm for identifying defects in the work-piece 12. For example, for one type of defect such as discoloration, the development environment 8 may produce an average color for an entire work-piece 12. By using a particular algorithm, the development environment 8 may be configured to identify small groupings of pixels in any one image that are beyond a certain tolerance level. Similarly, striations, creases, holes and other defects common to material used in the work-piece 12 may be identified. Accordingly, the development environment 8 may make use of a plurality of algorithms, routines, analyses or other techniques for evaluating quality of material or the work-piece 12.

Severity of defects may be graded. Likewise, a minimum quality of material (grade) may be specified for each product. Accordingly, development of nesting strategy may consider a variety of preferences or requirements for each product.

In some embodiments, a defect map may be produced in advance by physically marking the work-piece 12 with chalk, crayon, marker or the like. In some embodiments, the control system 30 obtains the map via the imaging device 22 for a digital representation. In some embodiments, a map can be obtained by digitizing flaws (physically marking or non-marking means) through use of the imaging device 22. In these embodiments, the map is generally combined with an outline of the perimeter of the work-piece 12 that is obtained from the imaging device 22 to build the complete map.

In some embodiments, such as where defect maps are created in advance, the particular work-piece 12 may be provided and remain affixed to a backing such as a board that includes the reference points disposed thereon. That is, in some embodiments, mapping the work-piece 12 is performed on a backing so as to avoid inaccuracies that may result by subsequent relaxation of the work-piece 12, stretching of the work-piece 12 or other such phenomena.

The maps described herein may be provided in any form deemed appropriate. For example, mapping of shapes, areas, and other such features may be according to a two-dimensional array of pixels associated with a sensor in the imaging device 22. Other units of measurement such as English, metric or SI units may be used.

Generally, the processing system 20 provides for automated or semi-automated processing. That is, the processing system 20 may be configured for performing at least some of the steps that have traditionally required human intervention without human involvement.

The disclosure features a process wherein the task of testing various strategies for nesting of parts to be cut in an automated CNC cutting operation is offloaded from the production workflow and done in a central bureau thus freeing up the production operation from the onerous task of material optimization. Several nesting strategies are supplied to the cutting operation based on supplied representative data. Real time nesting is performed in parallel for each of the supplied strategies on actual CNC data/material to determine the optimal material yield/nesting processing time solution. Alternatively, the nesting operation itself is preformed remotely after the optimal nesting strategy has been identified. This may completely remove any nesting strategy testing as well as nesting operations from the cutting operations, such as leather cutting production workflow. This process provides for greatly improved leather material usage and increases production capacity for CNC cutting, die cutting, and even hand cutting for leather and all other materials which require part nesting.

In some embodiments, development of the nesting strategy represents a process by which a computer will place parts according to variables set up by the user. Variables may be selected with the purpose of optimizing material utilization for the highest yield within the boundaries of a given users constraints. Constraints placed on the computer may be at odds with yield optimization but also may be necessary for unique attributes of a given customer application. One example of a system constraint is a limit on a number of rotations during computation. A given part may have been previously perforated and the perforations must align at 0 degrees or 90 degrees with the primary axis of the part. The 0 degrees or 90 degree constraint placed on the system in this case with have considerable negative impact on yield but it is necessary for an acceptable part.

A remote strategy selection scheme may give a production user a list of strategies. For example, a user may be provided with lists of nesting strategies that are: A) good for large hides with low perimeter to area (smooth perimeter); B) hides with low net usable area (not good for large parts); and, C) good for parts of relatively similar shapes and aspect ratios, etc. The customer would then manually pick the appropriate strategy to use for each hide/part combination.

In some embodiments, the production system may be configured to automatically select an appropriate nesting strategy to use based on any given hide and part profile.

In general, a desirable nesting strategy is likely to differ from hide to hide. An exemplary software product for comparing nesting strategies is SIMULNEST, available from Gerber Scientific International, Inc. of Tolland Conn. In order to provide comparison, multiple PC's may be used, each with a different strategy. In the example above, the customer would be supplied three strategies from the remote development system, with each of the personal computers developing nesting strategies for the separate list categories above. The "winner" would give the best yield based on the parts and hide input.

The remote development system may deliver a nesting strategy or group of nesting strategies to a customer and the customer performs his own nesting operation based on the next hide and the job at hand. The yield for the customer may be optimized, but the customer will still have to perform the nesting operation locally. If the nesting operation is done serially in the cutting process, nesting will still impact cutting throughput.

In some embodiments, the customer supplies the remote development system with actual hide and job data in a just-in-time workflow (for example, a day ahead of production). The remote nesting system will then identify the proper strategies per above, but does not send these off to the customer, but applies them to the customer production job and supplies the customer with a cut file for each hide. The customer does not have to perform the actual computer nesting operation, he just cuts. This optimizes the yield (with the remote strategy selection) and the throughput (with the remote nesting).

In some embodiments, remote strategy identification or nesting includes loading an app on various computers within a group, such as all computers at a business and on a given network. The app would then use the spare computing power during idle time to perform the number crunching and then sending the strategy or nested job file to the production computer. In addition to distributing the workload, a central computer program product would assemble data from the network computers and provide an appropriate strategy or other required information. This may be referred to as a "private cloud nesting system."

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. With regards to the work-piece, terminology such as "within" and "on" generally refer to appearance of the work-piece from the perspective of a user, system operator or other similarly interested party, and such limitations are to be perceived according to the standards of a user or consumer of the work product produced by the processing system 20.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for processing a work-piece comprising a sheet of material into pieces, the system comprising:
    a production environment including a facility for handling the work-piece, the production environment configured for collecting data characterizing the work-piece and for subsequently cutting the work-piece into a plurality of products; and
    a development environment including at least one computer separate from the production environment, the development environment configured for receiving characterization data from the production environment, and, based on a plurality of nesting variables, developing a nesting strategy for cutting a plurality of products from the work-piece and providing the nesting strategy to the production environment without affecting production;
    wherein developing the nesting strategy comprises:
        developing a first nesting strategy and a second nesting strategy by applying the plurality of nesting variables;
        iteratively changing the first nesting strategy and the second nesting strategy and comparing the first nesting strategy to the second nesting strategy to identify a preferred nesting strategy providing the best yield or processing time; and
        selecting the preferred nesting strategy.

2. The system as in claim 1, further comprising a computer program product comprising machine executable instructions stored on machine readable media, the computer program product comprising instructions for computing the nesting strategy.

3. The system as in claim 1, wherein each nesting strategy associates placement the plurality of shapes according to at least one of a shape of the work-piece, a seed-point associated with the work-piece, defects identified in the work-piece and grading of the material of the work-piece.

4. The system as in claim 1, wherein the development environment is configured to develop each nesting strategy according to at least one of a requirement for yield and a limitation on computing time.

5. The system as in claim 1, further comprising an imaging system comprising an imaging sensor, the imaging system configured for at least one of collecting an image of the work-piece, identifying a defect within the work-piece, and grading the quality of an area of the work-piece.

6. The system as in claim 1, wherein imaging data from the production environment is received by the development environment for at least one of remote inspection, scanning and strategy identification.

7. The system as in claim 1, further comprising a cutting system with at least a controller, the cutting system configured for at least one of: controlling a cutting-tool; projecting the nesting strategy onto the work-piece; facilitating manual placement of cutting dies onto the work-piece; and, placing cutting dies onto the work-piece.

8. The system as in claim 1, wherein the nesting strategy is configured for use by a computer numerically-controlled (CNC) machine configured for cutting the work-piece.

9. The system as in claim 1, wherein the development environment comprises a library module comprising data storage, the library module configured for at least one of storing information regarding the nesting strategy in a library, and retrieving information from the library for development of the nesting strategy.

10. The system as in claim 9, wherein the library module is configured to provide a seed-strategy to the development environment.

11. The system as in claim 9, wherein the library module is configured to store at least one of: layout information, hide geometry, a defect map, a job requirement, yield, computation time and processing time in the library.

12. The system as in claim 1, the development environment further comprises an input for receiving a seed-strategy for starting computation of the nesting strategy.

13. The system as in claim 1, wherein the development environment is configured to perform remote nesting and send a nesting job file to the production environment.

14. The system as in claim 1, wherein selecting a preferred nesting strategy comprises using a statistical analysis.

15. The system as in claim 1, wherein selecting a preferred nesting strategy comprises using a regression analysis.

16. The system as claimed in claim 1, wherein developing the nesting strategy comprises further comprises:
   selecting the preferred nesting strategy from the comparison according to user criteria of at least one of yield and processing time for the nesting strategy; and
   continuing developing, comparing and selecting of preferred nesting strategies until the user criteria have been reached.

17. The system as in claim 16, wherein the user criteria comprises a convergence of testing results.

18. A method for processing a work-piece comprising a sheet of material into a plurality of pieces of product, the method comprising:
   receiving criteria for a nesting strategy from a production environment including a facility for handling the work-piece, the production environment; and,
   using a development environment including at least one computer separate from the production environment, the development environment configured for receiving characterization data from the production environment, and, based on a plurality of nesting variables, developing a first nesting strategy and a second nesting strategy for cutting a plurality of products from the work-piece, iteratively changing the first nesting strategy and the second nesting strategy and comparing the first nesting strategy to the second nesting strategy to identify a preferred strategy providing the best yield or processing time, and providing the preferred nesting strategy to the production environment without impeding the production environment.

19. The method as in claim 18, wherein iteratively determining comprises changing a layout of the product to provide for increased product yield.

20. The method as in claim 18, further comprising providing a plurality of nesting strategies for a single work-piece.

21. The method as in claim 18, further comprising cutting the work-piece into the product according to the preferred nesting strategy.

22. The method as in claim 18, wherein selecting the preferred nesting strategy comprises at least one of comparing one nesting strategy to another nesting strategy and performing a statistical analysis.

23. The method as in claim 18, further comprising:
   selecting the preferred nesting strategy from the comparison according to user criteria of at least one of yield and processing time for the nesting strategy; and
   continuing developing, comparing and selecting of preferred nesting strategies until the user criteria have been reached.

24. A computer program product comprising machine executable instructions stored on machine readable media, the computer program product comprising instructions for processing a work-piece comprising a sheet of material into pieces of product by implementing a method, the method comprising:
   receiving from a production environment that includes a facility for handling the work-piece an image of the work-piece and an associated job description, the job description comprising a plurality of shapes to be cut from the work-piece;
   retrieving from a library first nesting strategy and a second nesting strategy, each comprising a layout of the shapes to be cut from the work-piece; and,
   using a development environment including at least one computer separate from the production environment, receiving characterization data from the production environment, and, based on a plurality of nesting variables, developing the first nesting strategy and the second nesting strategy for efficiently cutting a plurality of products from the work-piece and providing the first nesting strategy and the second nesting strategy for the production environment without affecting production;
   wherein developing the nesting strategy comprises iteratively rearranging the layout of shapes in the first nesting strategy and rearranging the layout of shapes in the second nesting strategy, and comparing the first nesting strategy to the second nesting strategy to identify a preferred nesting strategy providing the best yield or processing time, and selecting the preferred nesting strategy.

25. The computer program product as in claim 24, further comprising instructions for storing information regarding the nesting strategy in the library.

26. The computer program product as in claim 24, further comprising instructions for controlling a robotic system for placing at least one cutting die associated with a respective one of the shapes onto the work-piece.

27. The computer program product as in claim 24, further comprising instructions for controlling cutting of the work-piece into the pieces of product.

28. The computer program product as in claim 27, wherein the instructions for controlling cutting comprise instructions for controlling a computer numerically-controlled (CNC) machine.

29. The computer program product as in claim 24, further comprising instructions for operating a group of computers as a private cloud nesting system.

30. The computer program product as in claim 24, wherein developing the nesting strategy comprises further comprises:
   selecting the preferred nesting strategy from the comparison according to user criteria of at least one of yield and processing time for the nesting strategy; and
   continuing developing, comparing and selecting of preferred nesting strategies until the user criteria have been reached.

31. The computer program product as in claim 30, wherein the user criteria comprise at least one of yield, computing time, production time, and grade of material for each of the pieces of product.

* * * * *

US010338564C1

(12) EX PARTE REEXAMINATION CERTIFICATE (12082nd)
United States Patent
Gordon et al.

(10) Number: US 10,338,564 C1
(45) Certificate Issued: Jun. 28, 2022

(54) REMOTE YIELD OPTIMIZATION FOR LEATHER AND OTHER HETEROGENEOUS MATERIAL

(71) Applicant: GERBER TECHNOLOGY LLC, Tolland, CT (US)

(72) Inventors: Thomas A. Gordon, Glastonbury, CT (US); William T. Lord, Pelham, NH (US); Todd Alan Rhodes, Tolland, CT (US)

(73) Assignee: GERBER TECHNOLOGY LLC, Tolland, CT (US)

Reexamination Request:
No. 90/014,462, Feb. 24, 2020

Reexamination Certificate for:
Patent No.: 10,338,564
Issued: Jul. 2, 2019
Appl. No.: 14/937,487
Filed: Nov. 10, 2015

(51) Int. Cl.
*C14B 5/00* (2006.01)
*G05B 19/4097* (2006.01)
*G06Q 10/04* (2012.01)
*C14B 17/00* (2006.01)

(52) U.S. Cl.
CPC .............. *C14B 17/005* (2013.01); *C14B 5/00* (2013.01); *G05B 19/4097* (2013.01); *G06Q 10/043* (2013.01); *G05B 2219/35162* (2013.01); *G05B 2219/45044* (2013.01)

(58) Field of Classification Search
None
See application file for complete search history.

(56) References Cited

To view the complete listing of prior art documents cited during the proceeding for Reexamination Control Number 90/014,462, please refer to the USPTO's public Patent Application Information Retrieval (PAIR) system under the Display References tab.

*Primary Examiner* — Deandra M Hughes

(57) ABSTRACT

A system for processing a work-piece including a sheet of material into pieces includes a production environment configured for collecting data characterizing the work-piece and for subsequently cutting the work-piece into a plurality of products; and a development environment separate from the production environment, the development environment configured for receiving characterization data from the production environment, developing a nesting strategy for cutting the work-piece and providing the nesting strategy.

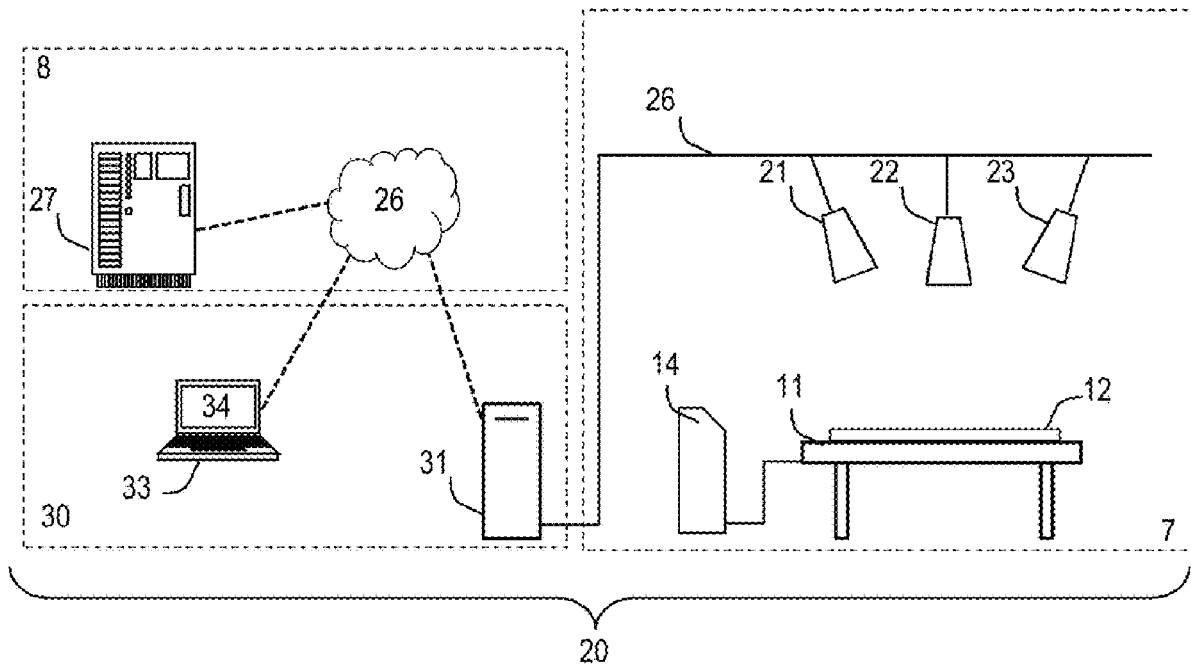

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 18, 19, 24 and 26-27 are determined to be patentable as amended.

Claims 2-17, 20-23, 25, 28-31, dependent on an amended claim, are determined to be patentable.

1. A system for processing a work-piece comprising a sheet of material into pieces, the system comprising:
   a production environment including a facility for handling the work-piece, the production environment configured for collecting data characterizing the work-piece and for subsequently cutting the work-piece into a plurality of [products] *individual pieces according to a nesting strategy*; and
   a development environment including at least one computer separate from the production environment, the development environment configured for receiving characterization data from the production environment, and, based on a plurality of nesting variables *relating to each of the individual pieces including at least one of shape bias, size bias, and perimeter buffer*, developing a nesting strategy for cutting a plurality of [products] *individual pieces* from the work-piece and providing the nesting strategy to the production environment without affecting production;
   wherein developing the nesting strategy comprises:
      developing *bifurcatedly* a first nesting strategy and a second nesting strategy *from an initial nesting strategy* by applying the plurality of nesting variables;
      iteratively changing the first nesting strategy and the second nesting strategy and comparing the first nesting strategy to the second nesting strategy to identify a preferred nesting strategy providing the best yield or processing time *thereby providing a new initial nesting strategy for further development*; and
      selecting the preferred nesting strategy.

18. A method for processing a work-piece comprising a sheet of material into a plurality of *individual* pieces of product, the method comprising:
    receiving criteria for a nesting strategy from a production environment including a facility for handling the work-piece[, the production environment]; and,
    using a development environment including at least one computer separate from the production environment, the development environment configured for receiving characterization data from the production environment, and, based on a plurality of nesting variables *relating to each of the individual pieces including at least one of shape bias, size bias and perimeter buffer*, developing *bifurcatedly* a first nesting strategy and a second nesting strategy *from an initial nesting strategy* for cutting [a] *the* plurality of [products] *individual pieces* from the work-piece, iteratively changing the first nesting strategy and the second nesting strategy and comparing the first nesting strategy to the second nesting strategy to identify a preferred strategy providing the best yield or processing *time thereby providing a new initial nesting strategy for further development*, and providing the preferred nesting strategy to the production environment without impeding the production environment.

19. The method as in claim 18, wherein iteratively determining comprises changing [a layout of the product] *an initial nesting strategy* to provide for increased product yield.

24. A computer program product comprising machine executable instructions stored on machine readable media, the computer program product comprising instructions for processing a work-piece comprising a sheet of material into *individual* pieces of product by implementing a method, the method comprising:
    receiving from a production environment that includes a facility for handling the work-piece an image of the work-piece and an associated job description, the job description comprising a plurality of [shapes] *the individual pieces* to be cut from the work-piece;
    retrieving from a library *a* first nesting strategy and a second nesting strategy, each comprising a layout of [the shapes] *the individual pieces* to be cut from the work-piece; and,
    using a development environment including at least one computer separate from the production environment, receiving characterization data from the production environment, and, based on a plurality of nesting variables *relating to each of the individual pieces including at least one of shape bias, size bias, and perimeter buffer*, developing the first nesting strategy and the second nesting strategy *from an initial nesting strategy for efficiently cutting a plurality of products* from the work-piece and providing the first nesting strategy and the second nesting strategy for the production environment without affecting production;
    wherein developing the nesting strategy comprises iteratively *bifurcatedly* rearranging the layout of [shapes] *individual pieces* in the first nesting strategy and rearranging the layout of [shapes] *individual pieces* in the second nesting strategy, and comparing the first nesting strategy to the second nesting strategy to identify a preferred nesting strategy providing the best yield or processing time *thereby providing a new initial nesting strategy for further development*, and selecting the preferred nesting strategy.

26. The computer program product as in claim 24, further comprising instructions for controlling a robotic system for placing at least one cutting die associated with a respective one of the [shapes] *individual pieces* onto the work-piece.

27. The computer program product as in claim 24, further comprising instructions for controlling cutting of the work-piece into the *individual* pieces of product.

* * * * *